US006814874B2

(12) United States Patent
Ruehrwein

(10) Patent No.: US 6,814,874 B2
(45) Date of Patent: Nov. 9, 2004

(54) CLARICONE SLUDGE LEVEL CONTROL SYSTEM

(75) Inventor: Donald Neil Ruehrwein, Batavia, IL (US)

(73) Assignee: Chicago Bridge & Iron Company, Plainfield, IL (US)

( * ) Notice: Subject to any disclaimer, the term of this patent is extended or adjusted under 35 U.S.C. 154(b) by 91 days.

(21) Appl. No.: 10/212,887

(22) Filed: Aug. 6, 2002

(65) Prior Publication Data

US 2004/0026333 A1 Feb. 12, 2004

(51) Int. Cl.[7] .......................... B01D 21/08; B01D 21/24
(52) U.S. Cl. ....................... 210/744; 210/803; 210/104; 210/112; 210/535
(58) Field of Search ................................. 210/739, 742, 210/744, 745, 803, 104, 112, 533, 534, 535, 536

(56) References Cited

U.S. PATENT DOCUMENTS

| 4,146,471 | A | | 3/1979 | Wyness ........................ 210/20 |
| 4,226,714 | A | * | 10/1980 | Furness et al. ............. 210/723 |
| 4,765,891 | A | | 8/1988 | Wyness ....................... 210/207 |
| 5,360,538 | A | * | 11/1994 | Beard ......................... 210/96.1 |
| 5,958,249 | A | * | 9/1999 | Fassbender et al. ........ 210/739 |
| 6,062,070 | A | * | 5/2000 | Maltby et al. ............. 73/61.49 |
| 6,673,240 | B2 | * | 1/2004 | Fassbender et al. .......... 210/87 |

OTHER PUBLICATIONS

Raw Water Clarifier, Blanket Level Control, BinMinder 9300™, Entech Design, Inc., 315 S. Locust, Denton, Texas 76201, Process Control (abstract).
Clarifier Design, Manual of Practice No. FD–8, prepared by Task Force on Clarifier Design, Max Augustus, Chairman, Design Concepts and Considerations, pp. 42–44 (1985).
http://www.sludgecontrols.com//602brochure.html, Process Control (abstract) p. 3 of 5.
Chemical Equipment, New Products, Level Control (abstract), Markland Specialty Engrg. Ltd., 48 Shaft Road, Rexdale (Toronto), ON M9W 4M2, CANADA.
Ametek Drexelbrook, CCS4000 Sludge Blanket and Clarity Loss Monitor, http://www.drexelbrook.com/Ccs4000.htm. (abstract).
Partech—suspended solids, turbidity and sludge level detection instruments, 8100 and 8200 Monitor, http://www.keison.co.uk/partech/partechl.htm (abstract).
OptiQuant™ Sludge Level Monitor: Product Overview, http://www.hach.com/spec/OptiQuantSLM_overview.htm (abstract).
Circular Clarifiers, Chapter 3, pp. 51–72.
ClariFlow, Upflow Solids Contact Units, Bulletin No. 6–W–46A, Walker Process, Division of Chicago Bridge & Iron Company, pp. 1–16.
6–10 Gas–Solid Separations through 6–17 Separation by Filtration.
Kerri et al., "Design of Teacup Solids Separators for Treatment of Sewer Overflows", *Prog. Wat. Tech.*, 10(5/6):811–820 (1978).

* cited by examiner

*Primary Examiner*—Frank M. Lawrence
(74) *Attorney, Agent, or Firm*—Marshall, Gerstein & Borun LLP

(57) ABSTRACT

A ClariCone-type clarifier is provided with a level sensor, a flow-condition detector, and a controller that work together for automatic control of a blow-down valve. The flow-condition detector detects a condition of the flow through the tank. The detector sends the input to the controller, which uses the input to determine a desired blow-down level. The level sensor detects the height of slurry in the tank, and the controller opens the valve when the slurry level reaches the level determined by the controller. The valve can be set to close after a predetermined fixed period of time, by a timer, or when the level sensor detects that the slurry level has fallen to a predetermined or calculated blow-down termination level.

19 Claims, 5 Drawing Sheets

CLARICONE SLUDGE LEVEL CONTROL SYSTEM

BACKGROUND OF THE INVENTION

The invention relates generally to municipal or industrial liquid clarification tanks, and more particularly to a slurry level control system for "ClariCone" type upflow liquid clarification tanks that have a lower section, a conically-shaped flocculation/clarification section, a liquid outlet, a slurry outlet, and a valve on the slurry outlet.

Conventional Clarifiers

In conventional water treatment clarifiers, the main purpose of the clarifier is to separate the solids from the water. The solids settle to the bottom of the clarifier and accumulate to form a slurry layer in the bottom of the clarifier. The slurry level in the clarifier does not directly affect the water treatment process.

Excess slurry is periodically wasted from the clarifier, and the slurry level is typically maintained above some minimum height to prevent clear water from being discharged during those times. The slurry level is also typically maintained below a certain maximum height to prevent the slurry from becoming septic and to prevent the slurry from building up to such a high level that slurry is carried over the weirs with the effluent. The desired slurry level is not dependent on such treatment parameters as the flow rate or the raw water turbidity.

Conventional Solids-Contact Clarifiers

In conventional solids-contact clarifiers, or reactor clarifiers, it is important for the solid particles in the raw water to be mixed with the previously-formed slurry to allow the small raw water particles to come into contact with, and stick to, the previously-formed slurry particles. The larger, denser slurry particles settle more quickly and allow the clarifier to be operated at a higher hydraulic loading rate. Coagulating and flocculating chemicals are typically added to the raw water to enhance this particle agglomeration process. In this type of clarifier, the slurry layer is an important part of the treatment process.

These clarifiers typically include some type of mechanical slurry recirculation equipment to mix the previously-formed slurry particles with the fine particles in the raw water. This typically occurs in a central flocculation chamber within the clarifier. The central flocculation chamber is typically sized to provide a certain minimum detention time for the water being treated. The slurry level is typically kept at or above a certain minimum level to make sure that the slurry recirculation equipment can pick up the settled slurry and mix it with the incoming raw water. Similarly, a minimum slurry level may be kept to ensure that the water exiting the central flocculation area has to pass through the bed of previously formed slurry to allow further contact between the fine particles in the raw water with the larger, denser slurry particles.

In both cases, the slurry level is maintained at a certain elevation that is determined by the recirculation equipment dimensions or by the central flocculation area discharge elevation. The desired slurry level is not dependent on such treatment parameters as the flow rate or the raw water turbidity.

"ClariCone"™ type clarifiers

In a ClariCone type clarifier, the water being treated flows upwards through a cone-shaped vessel. The vertical velocity of the water (the rise rate) changes as the water moves upwards through the conical portion of the clarifier. The rise rate is high in the small diameter, lower end of the conical portion of the clarifier. Particles in the water settle through the water at a settling velocity (settling rate) that depends on the size and density of the particles. Large, dense particles settle at a higher rate, and can accumulate at higher rise rates (at lower elevations within the conical portion of the clarifier) than smaller, less dense particles.

A slurry layer accumulates in the lower portion of the conical section of the clarifier. The volume of the slurry layer determines the amount of time that it takes for the water to flow through the slurry layer. This detention time within the slurry layer is important in that it provides the time for fine particles in the raw water to contact, and adhere to, the larger, denser, previously formed slurry particles in the slurry layer. A thicker slurry layer minimizes the amount of treated water that is wasted along with the slurry when excess slurry is wasted from the clarifier.

The top of the slurry layer is maintained at an elevation that will provide at least a certain desired minimum slurry layer detention time and at an elevation that will prevent the rise rate of the water at the slurry layer surface from exceeding a certain desired maximum value. The elevation at which these values occur changes with the flow rate of the water being treated. The desired slurry layer detention time and the desired maximum rise rate also change with such treatment parameters as the water temperature and the raw water contaminant level.

Conventionally, the slurry level in a ClariCone-type clarifier is adjusted manually by the operator, based on observations of the slurry layer.

SUMMARY OF THE INVENTION

Like previously-known ClariCone-type clarifiers, a tank within the scope of the present invention has a lower section, a conically shaped flocculation/clarification section, a liquid outlet, a slurry outlet, and a valve on the slurry outlet. Unlike previously-known ClariCone-type clarifiers, it also has a level sensor, a flow-condition detector, and a controller that work together for automatic control of the valve.

The lower section of the tank includes a liquid inlet through which liquid to be clarified enters the tank. The flocculation/clarification section of the tank is above the lower section, and has an outwardly-sloping sidewall. A liquid outlet near the top of the flocculation/clarification section is used to draw off clarified liquid.

The slurry outlet is within the flocculation/clarification section. It is connected to the valve that can be used to drain slurry from the outlet. The slurry outlet may comprise a slurry concentrator, and may be fixed in position.

The flow-condition detector is used to provide information that is used in determining when the slurry has accumulated to a level where it is desirable to waste, or blow down, excess slurry from the tank. This level is called the "blow-down level." The flow condition detects a condition of the flow through the clarification tank. For example, the flow-condition detector may be a flow rate sensor. Alternatively, the flow-condition detector may measure the quality of the water, such as its temperature, turbidity, or hardness. The detector sends the input concerning the detected condition to the controller.

The controller uses the input from the flow-condition detector to determine the desired blow-down level. The desired blow-down level may, for example, be based on an incremental height above a calculated minimum slurry level, such as 10% or 18" above a calculated minimum slurry level. Other factors may also be considered in determining the desired blow-down level. For example, the desired blow-down level may vary depending upon the configuration and dimensions of the tank, and the desired detention time and rise rate.

The level sensor detects the height of slurry in the tank, and the controller opens the valve when the slurry level reaches the desired blow-down level determined by the controller.

The closing of the valve can be controlled in many ways. The valve can be set to close after a predetermined fixed period of time. Another option is to provide an adjustable drain timer. Yet another option is to set the valve so that is closes automatically when the level sensor detects that the slurry level has fallen to a predetermined or calculated blow-down termination level.

DETAILED DESCRIPTION

Figure 1:
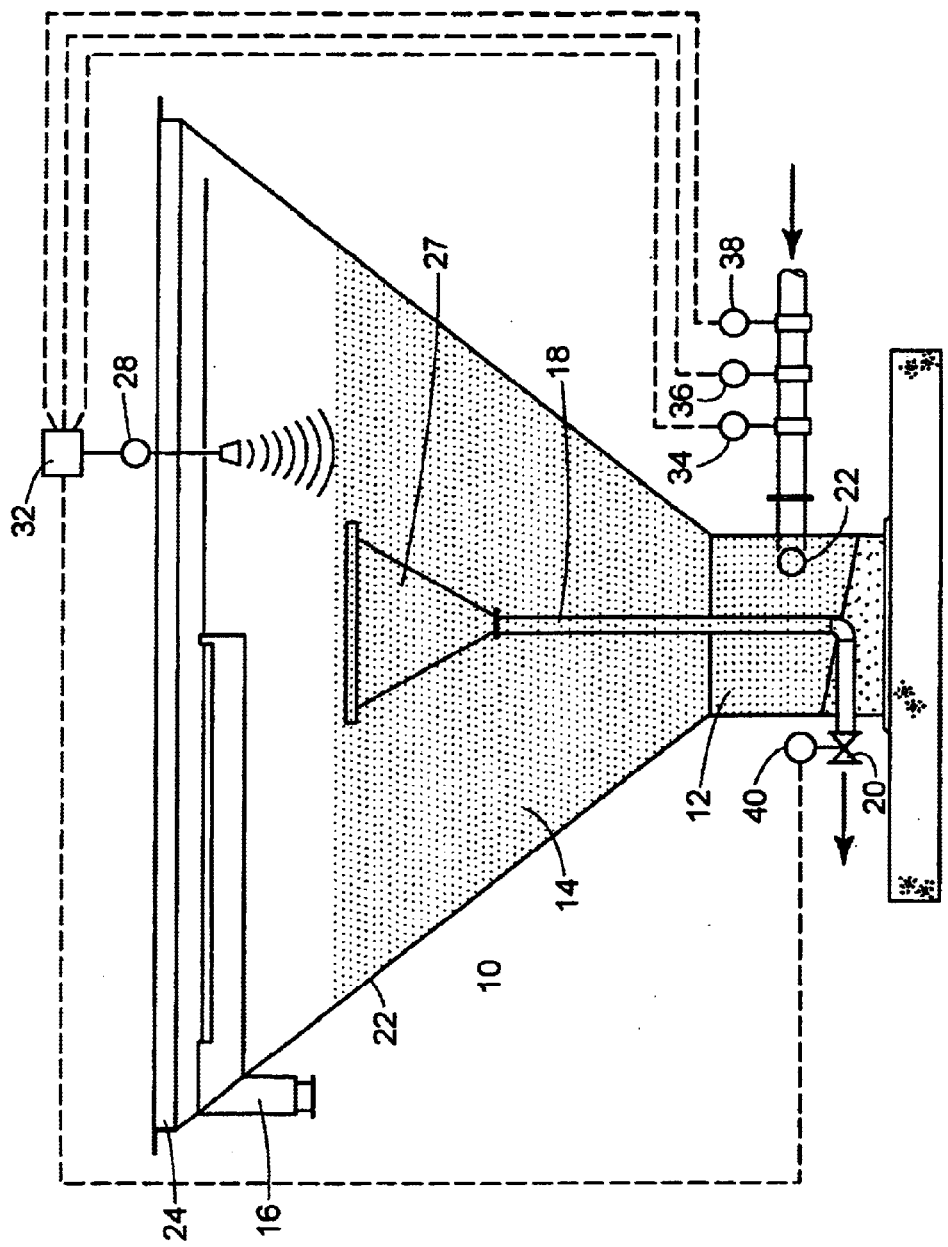
FIG. 1 is a cross-sectional view of one embodiment of a clarifier in accordance with the present invention.
Figure 2:
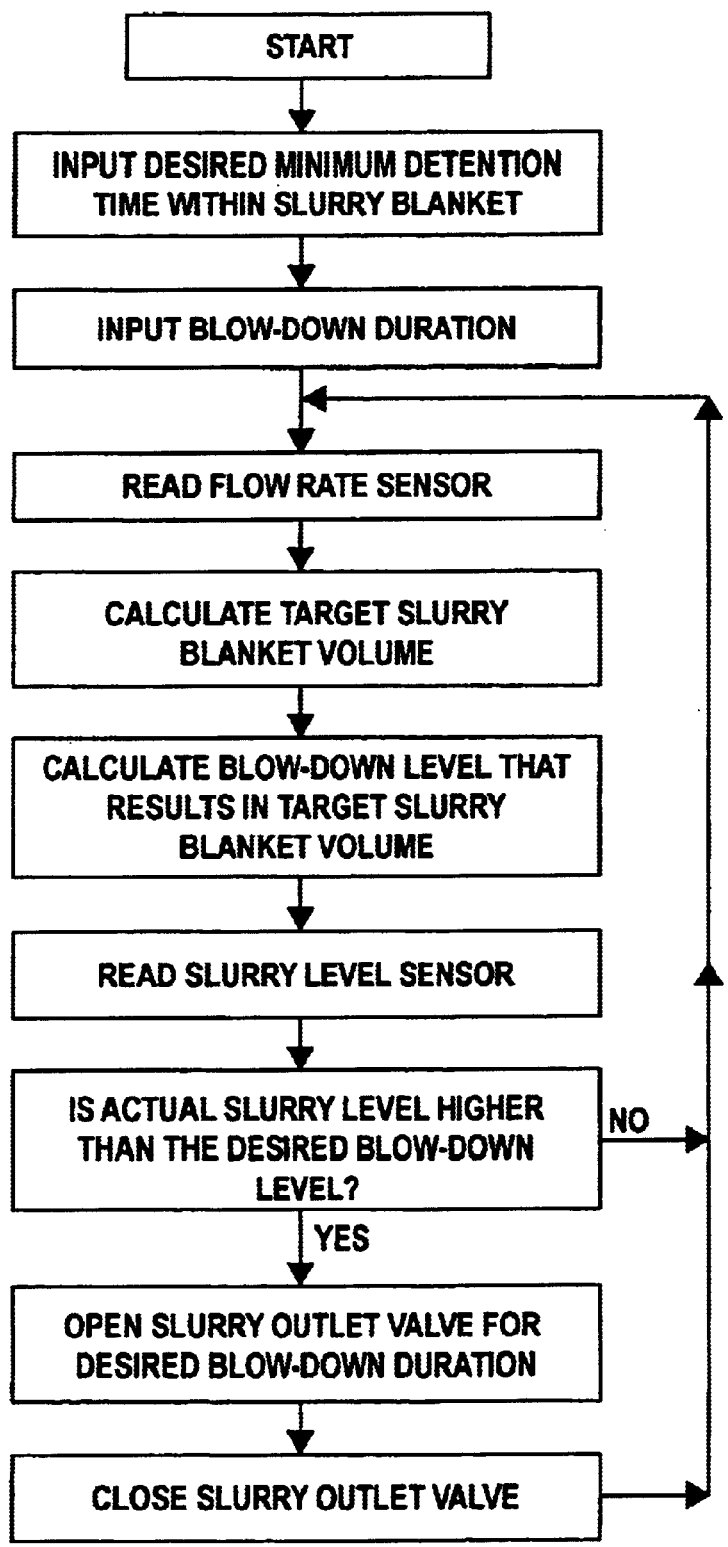
FIGS. 2–5 are flowcharts showing possible programming of the controller in FIG. 1.
Figure 3:
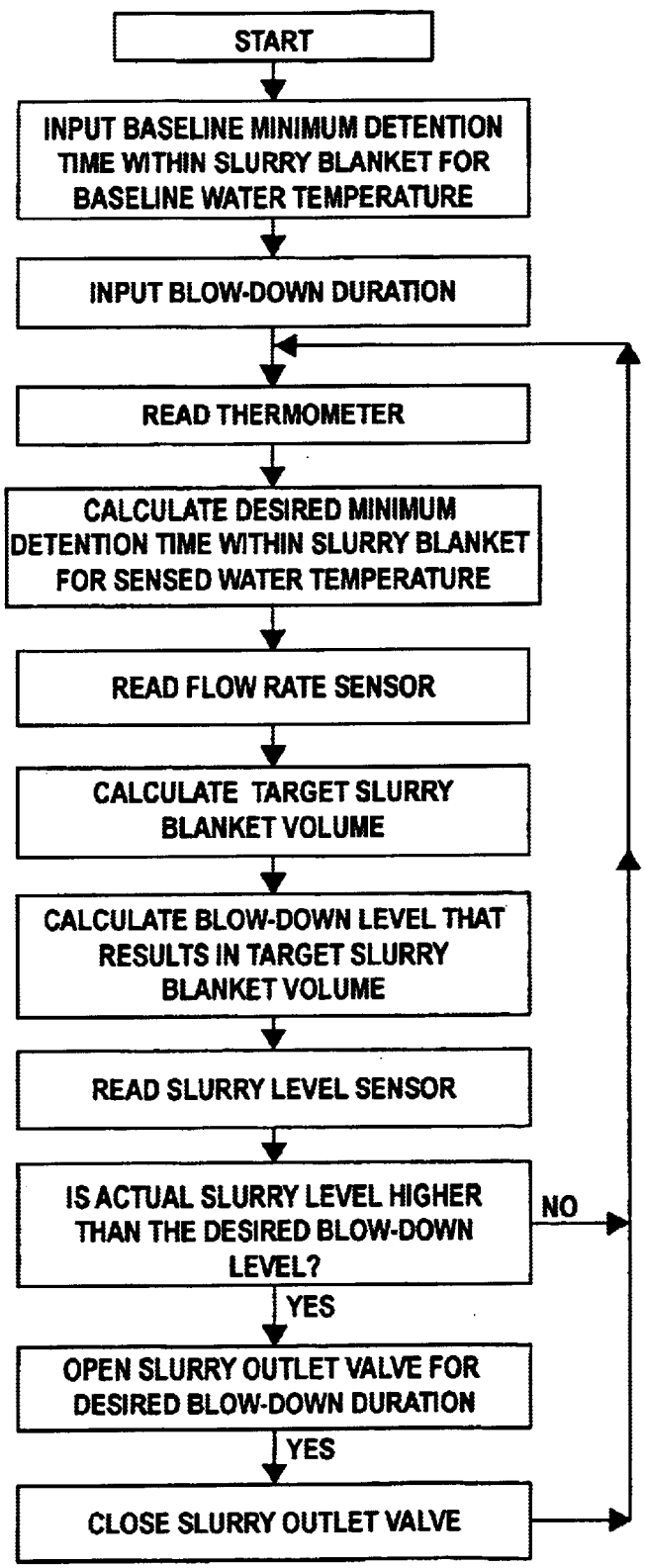
Figure 4:
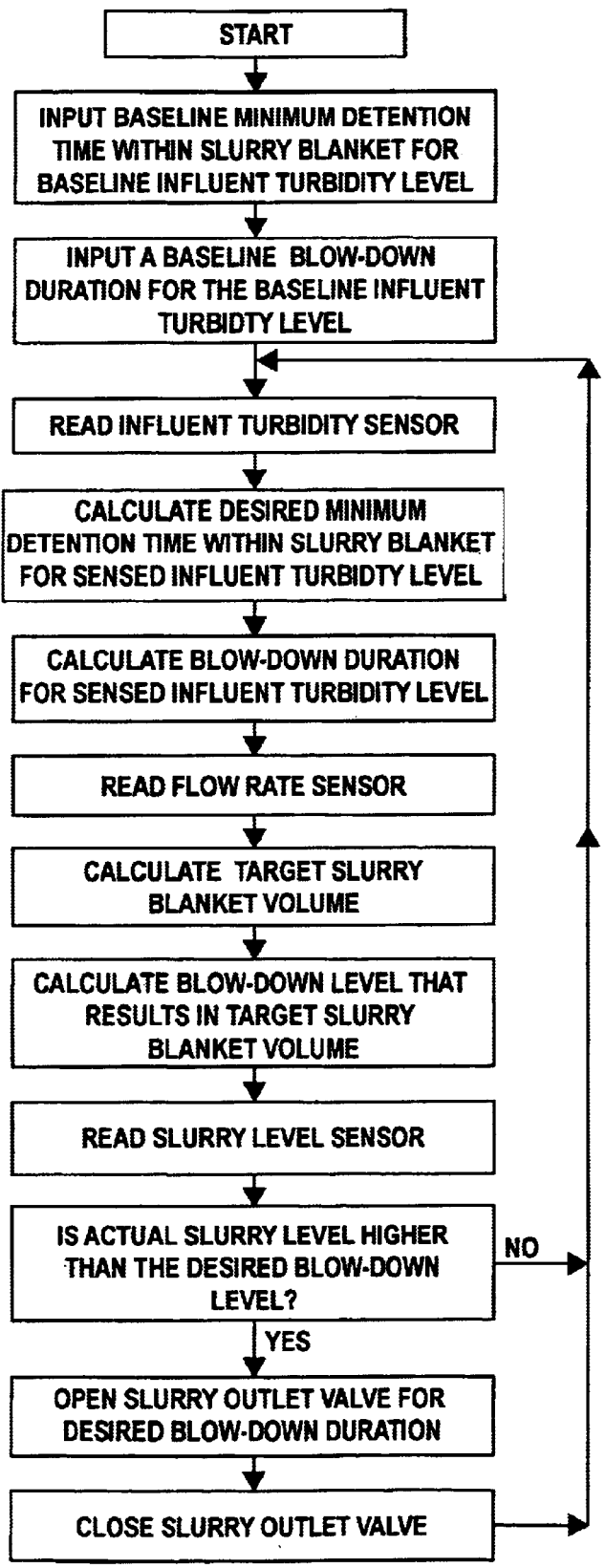

FIG. 1 illustrates one embodiment of a liquid clarification tank 10 in accordance with the present invention. The tank includes a lower section 12, a flocculation/clarification section 14, a liquid outlet 16, a slurry outlet 18, and a valve 20 on the slurry outlet.

The lower section 12 of the tank 10 is preferably cylindrical, and includes a liquid inlet 22 through which liquid to be clarified enters the tank. The lower section of the illustrated tank is about 8'-6" in diameter and about 7'-0" tall. The inlet has an internal diameter of about 16 inches. Other arrangements and configurations could also be used.

The flocculation/clarification section 14 of the tank 10 is above the lower section 12. The flocculation/clarification section of the illustrated tank is about 17'-0" tall, is conical in shape, and has an outwardly-sloping sidewall 22 that extends from the top of the lower section to an upper cylindrical section 24. The upper cylindrical section has a diameter of about 42"-0". The liquid outlet 16 near the top of the flocculation/clarification section is used to draw off clarified liquid. The illustrated outlet has two 21'-0" long weirs, one of which is shown. As with the lower section, other arrangements and configurations of the flocculation/clarification section could also be used.

The slurry outlet 18 is within the flocculation/clarification section 14 of the tank. The slurry outlet is connected to the valve 20, which, when opened, drains slurry from the tank. The illustrated slurry outlet is fixed in position. An adjustable outlet could also be used. The illustrated outlet includes an optional control hopper 27 that concentrates or thickens the slurry. The top edge of the illustrated hopper is set about 7'0" below the top of the flocculation/clarification section, and has an upper diameter of approximately 8'-6" and a depth of approximately 7'-0". The illustrated valve is connected to a discharge line that has an inside diameter of approximately 6 inches.

Unlike previously-known ClariCone-type clarifiers, the tank 10 that has been illustrated also has a level sensor 28, three flow-condition detectors, and a controller 32 that work together for automatic control of the valve. Each of the flow-condition detectors detects a condition of the flow through the clarification tank, such as flow rate or water quality. In the illustrated tank, one of the flow-condition detectors is a flow rate sensor 34, another is a thermometer 36, and the third is a turbidity sensor 38. Other types of flow-condition sensors might also be used. For example, a sensor to detect water hardness might be used. While three flow-condition detectors are illustrated here, only one is necessary, and it need not be located in the illustrated location. For example, the detector could be located on or even upstream of the liquid inlet 22, or on or downstream of the liquid outlet 16.

In use, the flow-condition detector sends input to the controller 32, which determines the blow-down level at which the valve 20 will be opened to drain slurry from the tank. In the illustrated embodiment of the invention, the controller includes a calculator that has been programmed to determine the blow-down level using the input from the flow condition detector. The calculator uses information about the existing conditions in the tank, as sensed by the flow-condition detector, to calculate a minimum slurry level. In this embodiment of the invention, the dimensions of the tank and the desired minimum detention time are also considered in calculating the minimum slurry level. The controller may then set the blow-down level at an incremental height above that minimum slurry level, such as 10% or 18" above the minimum slurry level. However, it is not necessary for two separate height levels (a minimum slurry level and a blow-down level) to be calculated by the controller. The controller may be programmed to determine the blow-down level directly from the input from the flow-condition detector.

FIGS. 2–5 show different examples of programming that might be used to determine the blow-down level based on a desired minimum detention time. In these examples, the calculator uses the desired minimum detention time to calculate a target slurry blanket volume. The target slurry blanket volume varies with the flow rate, and may be calculated using the flow rate that is sensed by the sensor 34 seen in FIG. 1. The target slurry blanket volume is then used, along with information about the size of the tank, to determine the blow-down level.

There are different ways to set the desired minimum detention time. In the programming seen in FIGS. 2 and 5, the desired minimum detention time is inputted directly by the operator. In the programming seen in FIG. 3, the operator inputs a baseline minimum detention time at a baseline water temperature (such as 55°), and the desired minimum detention time is calculated based on the baseline minimum detention time and the temperature of the water that is sensed by the thermometer 36. In the programming seen in FIG. 4, the operator inputs a baseline minimum detention time at a baseline turbidity (such as 30 NTU), and the desired minimum detention time is calculated based on the baseline detention time and the turbidity level that is sensed by the turbiditry sensor 38. Other ways of determining the desired maximum detention time could also be used.

In use, the level sensor 28 detects the slurry level in the tank 10. When the slurry level exceeds the desired blow-down level, the controller 32 opens the valve 20. In the illustrated embodiment of the invention, the controller includes an actuator 40 that opens the valve.

There are different ways to control the blow-down duration. In the programming seen in FIGS. 2 and 3, a desired blow-down duration time is inputted directly by the operator. In the programming seen in FIG. 4, the operator inputs a baseline blow-down duration at the baseline turbidity, and the blow-down duration is calculated based on the baseline blow-down duration and the turbidity that is sensed by the turbidity sensor 38. Other ways of controlling the blow-down duration can also be used.

Figure 5:
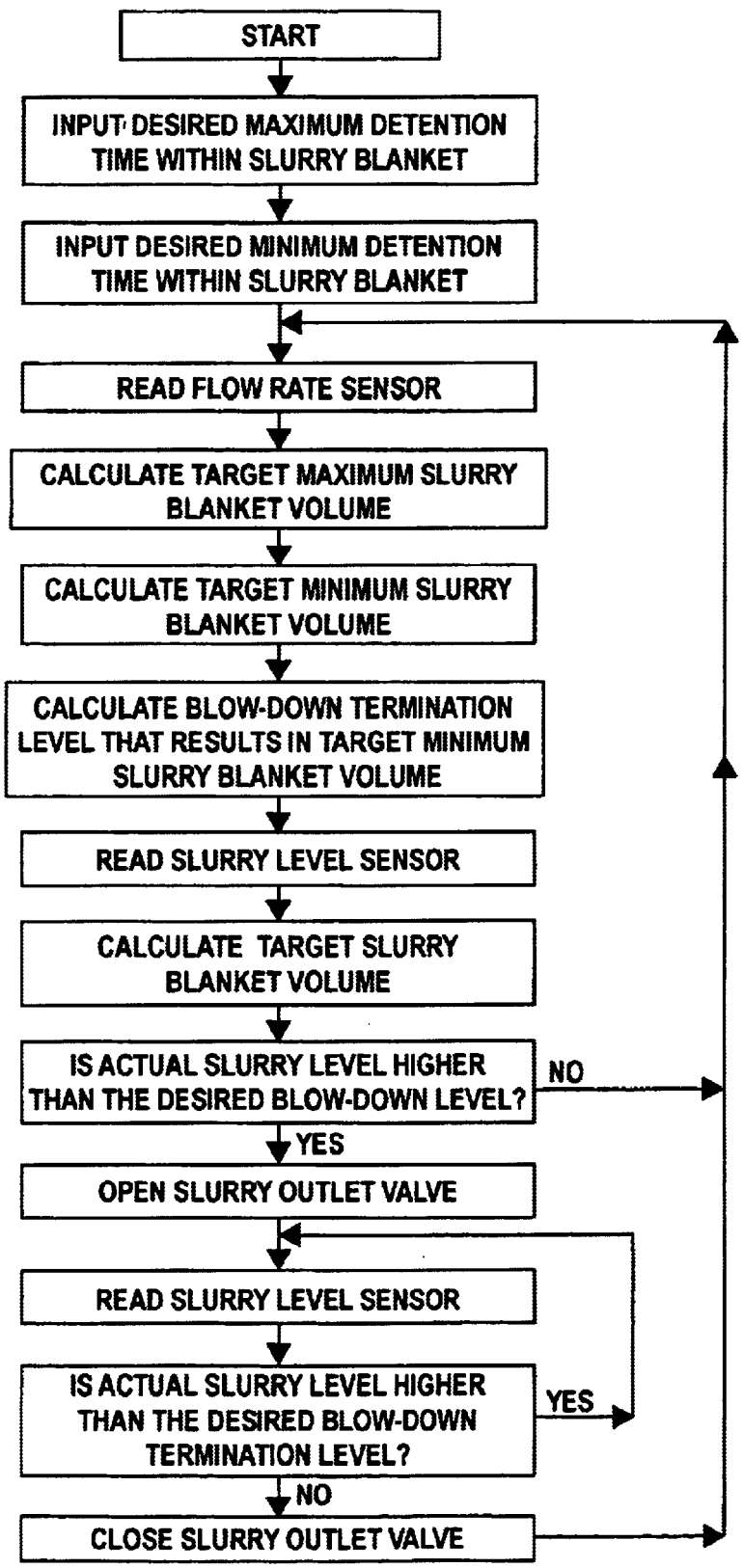

In the embodiment of the invention illustrated in FIG. 1, the controller 32 is programmed to determine a desired blowdown termination level based on the input from the flow-condition sensor. FIG. 5, for example, shows an example of programming that might be used in connection with the flow rate sensor 34. In this embodiment of the invention, the programming not only calculates a desired blow-down level, but also a desired blow-down termination level. These levels are calculated based upon inputted desired maximum and minimum detention times. (As with the programming seen in FIG. 2, the detention times are calculated using the tank dimensions and the slurry blanket volumes that provide the indicated detention times at the flow rate sensed by the flow rate sensor.)

In this embodiment of the invention, the actuator 40 automatically closes the valve 20 when the level sensor 28 detects that the slurry level reaches the blow-down termination level calculated by the controller or some incremental height above the blow-down termination level. The sensor that has been illustrated senses the blow-down level and the blow-down termination level with a single sensor. Other sensor types could be used that utilize two separate sensors to determine these levels.

The closing of the valve 20 can be controlled in other ways. For example, the valve could be set so that it closes automatically when the level sensor 28 detects that the slurry level has fallen to a predetermined close-valve level. Alternatively, an adjustable drain timer could be provided on the valve so that the operator can adjust the drain time. Yet another alternative is to use a valve that closes after a predetermined fixed period of time. In the illustrated tank, it may be sufficient to use a valve that automatically closes after a period of approximately 2 minutes.

Other modifications should be apparent to those skilled in the art. This detailed description has been given for clarity of understanding only. It is not intended and should not be construed as limiting the scope of the invention, which is defined in the following claims.

What is claimed is:

1. A liquid clarification tank comprising:
   a lower section with a liquid inlet;
   a flocculation/clarification section with an outwardly-sloping sidewall above the lower section;
   a liquid outlet near the top of the flocculation/clarification section;
   a slurry outlet below the top of the flocculation/clarification section;
   a valve on the slurry outlet that, when it is at least partially opened, drains slurry from the tank;
   a flow-condition detector;
   a level sensor capable of detecting a slurry level in the tank;
   a controller that is connected to the flow-condition detector, is programmed to determine a blow-down level based on input from the flow-condition detector, and opens the valve when the slurry level reaches the determined blow-down level;
   a calculator that is connected to the flow-condition detector and is programmed to determine a desired blow-down level based on input from the flow-condition detector; and
   an actuator that is connected to the valve and opens the valve when the slurry level reaches the desired blow-down level determined by the controller.

2. A liquid clarification tank as recited in claim 1, in which the valve is set to open for a fixed period of time.

3. A liquid clarification tank as recited in claim 1, and further comprising an adjustable drain timer.

4. A liquid clarification tank as recited in claim 1, in which the valve closes when the slurry level reaches a desired blow-down termination level.

5. A liquid clarification tank as recited in claim 1, in which the valve closes when the level sensor detects that the slurry level reaches a desired blow-down termination level.

6. A liquid clarification tank as recited in claim 1, in which:
   the controller is programmed to determine a desired blow-down termination level; and
   the valve closes when the level sensor detects that the slurry level reaches the desired blow-down termination level.

7. A liquid clarification tank as recited in claim 1, in which the flow-condition detector is a flow rate sensor.

8. A liquid clarification tank as recited in claim 1, in which the flow-condition detector measures the quality of water in the tank.

9. A liquid clarification tank as recited in claim 1, in which the flow-condition detector measures the quality of water upstream of the tank.

10. A liquid clarification tank as recited in claim 1, in which the flow-condition detector measures the quality of water downstream of the tank.

11. A liquid clarification tank as recited in claim 1, in which:
    the tank comprises a second flow-condition sensor; and
    the controller is programmed to determine the blow-down level based on input of a second flow-condition parameter from the second flow-condition sensor.

12. A liquid clarification tank as recited in claim 1, in which the blow-down level is determined using information about the configuration and dimensions of the clarification tank.

13. A liquid clarification tank as recited in claim 1, in which the slurry outlet comprises a slurry concentrator.

14. A liquid clarification tank as recited in claim 1, in which the slurry outlet is fixed in position.

15. A liquid clarification tank comprising:
    a lower section with a liquid inlet;
    a flocculation/clarification section with an outwardly-sloping sidewall above the lower section;
    a liquid outlet near the top of the flocculation/clarification section;
    a slurry outlet below the top of the flocculation/clarification section;
    a valve on the slurry outlet that, when it is at least partially opened, drains slurry from the tank;
    a flow-condition detector that measures the temperature of water in the tank;
    a level sensor capable of detecting a slurry level in the tank; and
    a controller that is connected to the flow-condition detector, is programmed to determine a blow-down level based on input from the flow-condition detector, and opens the valve when the slurry level reaches the determined blow-down level.

16. A liquid clarification tank comprising:
    a lower section with a liquid inlet;
    a flocculation/clarification section with an outwardly-sloping sidewall above the lower section;

a liquid outlet near the top of the flocculation/clarification section;

a slurry outlet below the top of the flocculationl/clarification section;

a valve on the slurry outlet that, when it is at least partially opened, drains slurry from the tank;

a flow-condition detector that measures the turbidity of water in the tank;

a level sensor capable of detecting a slurry level in the tank; and a controller that is connected to the flow-condition detector, is programed to determine a blow-down level based on input from the flow-condition detector, and opens the valve when the slurry level reaches the determined blow-down level.

17. A liquid clarification tank comprising:

a lower section with a liquid inlet;

a flocculationl/clarification section with an outwardly-sloping sidewall above the lower section;

a liquid outlet near the top of the flocculation/clarification section;

a slurry outlet below the top of the flocculation/clarification section;

a valve on the slurry outlet that, when it is at least partially opened, drains slurry from the tank;

a flow-condition detector that measures the hardness of water in the tank;

a level sensor capable of detecting a slurry level in the tank; and a controller that is connected to the flow-condition detector, is programmed to determine a blow-down level based on input from the flow-condition detector, and opens the valve when the slurry level reaches the determined blow-down level.

18. A method for controlling the level of slurry in liquid clarification tank that comprises a lower section, a liquid inlet, a flocculation/clarification section with an outwardly-sloping sidewall above the lower section, a liquid outlet near the top of the flocculation/clarification section, a slurry outlet below the top of the flocculation/clarification section, and a valve on the slurry outlet that, when it is at least partially opened, drains slurry from the tank, the method comprising the steps of:

providing a flow-condition detector, a level sensor, a calculator that is connected to the flow-condition detector, and an actuator that is connected to the valve;

detecting a slurry level in the tank with the level sensor;

determining a desired blow-down level with the calculator, based on input from the flow-condition detector; and automatically opening the valve with the actuator when the slurry level reaches the desired blow-down level.

19. A method as recited in claim 18, in which the blow-down level is determined using information about the configuration and dimensions of the clarification tank.

* * * * *

UNITED STATES PATENT AND TRADEMARK OFFICE
CERTIFICATE OF CORRECTION

PATENT NO. : 6,814,874 B2
DATED : November 9, 2004
INVENTOR(S) : Donald Neil Ruehrwein It is certified that error appears in the above-identified patent and that said Letters Patent is hereby corrected as shown below:

<u>Column 7,</u>
Line 3, remove "flocculationl/" and replace with -- flocculation/ --.

Signed and Sealed this

Thirtieth Day of August, 2005

JON W. DUDAS
*Director of the United States Patent and Trademark Office*